United States Patent
Fukushima et al.

(10) Patent No.: US 6,818,679 B2
(45) Date of Patent: Nov. 16, 2004

(54) PHOTOPOLYMERIZABLE DENTAL COATING COMPOSITION

(75) Inventors: Shoichi Fukushima, Tokyo (JP); Tomohiro Kumagai, Tokyo (JP)

(73) Assignee: GC Corporation, Tokyo (JP)

( * ) Notice: Subject to any disclaimer, the term of this patent is extended or adjusted under 35 U.S.C. 154(b) by 120 days.

(21) Appl. No.: 10/246,534

(22) Filed: Sep. 19, 2002

(65) Prior Publication Data

US 2003/0060534 A1 Mar. 27, 2003

(30) Foreign Application Priority Data

Sep. 21, 2001 (JP) ........................................ 2001-288261

(51) Int. Cl.$^7$ ................................................ C08F 2/46
(52) U.S. Cl. ........................ 522/64; 522/83; 522/182; 522/120; 522/121; 523/115
(58) Field of Search ................ 522/64, 83, 120, 522/121, 182; 523/115, 109

(56) References Cited

U.S. PATENT DOCUMENTS

| | | | |
|---|---|---|---|
| 4,616,073 A | * 10/1986 | Antonucci | ................. 526/246 |
| 5,026,902 A | 6/1991 | Fock et al. | |
| 5,061,184 A | * 10/1991 | Yamazaki et al. | ....... 433/228.1 |
| 5,250,641 A | 10/1993 | Kumagai et al. | |
| 5,770,638 A | 6/1998 | Ueno et al. | |
| 6,001,896 A | 12/1999 | Ueno et al. | |
| 6,114,408 A | * 9/2000 | Dickens | ...................... 522/182 |
| 6,184,339 B1 | 2/2001 | Stansbury et al. | |
| 6,221,931 B1 | 4/2001 | Sakuma et al. | |
| 6,265,508 B1 | 7/2001 | Nakayama | |
| 6,410,612 B1 | * 6/2002 | Hatanaka | ..................... 523/115 |
| 6,506,815 B2 | 1/2003 | Shinozako et al. | |

FOREIGN PATENT DOCUMENTS

JP 5-155729 6/1993

* cited by examiner

*Primary Examiner*—Susan Berman
(74) *Attorney, Agent, or Firm*—Oblon, Spivak, McClelland, Maier & Neustadt, P.C.

(57) ABSTRACT

To provide a photopolymerizable dental coating composition that, when applied to the surface of a dental resin material such as crown restoratives, dental fillers, and denture or denture base resins, is thoroughly cured upon irradiation with a visible light and produces a smooth, colorless and transparent cured surface after curing so that a film having superior durability, abrasion resistance and resistance to discoloration can be formed, the photopolymerizable dental coating composition includes a volatile (meth)acrylate compound, a polyfunctional acrylate as a cross-linking agent, a fluoroalkyl group constituted of at least one fluorocarbon-containing (meth)acrylate compound for improving the durability, abrasion resistance and resistance to discoloration after curing, and an acyl phosphine oxide-based polymerization initiator having a high polymerization promoting effect for monomers, which does not make the polymerized composition remain yellowish.

7 Claims, No Drawings

PHOTOPOLYMERIZABLE DENTAL COATING COMPOSITION

BACKGROUND OF THE INVENTION

1. Field of the Invention

The present invention relates to a dental coating material, which is applied to surfaces of dental resin materials such as crown restoratives, dental fillers, and denture or denture base resins, and then polymerized upon irradiation with a visible light, thereby improving smoothness, durability and other properties of the surfaces of the dental resin materials.

2. Description of the Conventional Art

In the dental remedy in recent years, organic dental resin materials are widely employed for crown restoratives such as inlay, onlay, and crown, fillers for dental deficient portions, and denture base materials. For such dental resin materials, the surface of a material to be exposed within an oral cavity is desired to be smooth as far as possible. Accordingly, it is considered that careful polishing works are needed. As a result, in order to obtain a sufficient surface smoothness, there was involved a problem that a considerable period of time must be taken for polishing. Also, there was involved another problem that since the dental resin material is used under a severe condition within the oral cavity, coloration and staining occur due to the deterioration of the surface of the dental resin material. In order to solve these problems, there is employed a method in which after polishing the surface of the dental resin material into a smooth state, the surface of the dental resin material is coated with and protected by a dental coating material having a relatively high hardness, which is comprised of a polymerizable monomer as a major component.

Hitherto, ultraviolet light-polymerizable dental coating compositions comprising a photopolymerizable oligomer, a reactive monomer, and a ultraviolet light-sensitive polymerization initiator, while applying an acrylic hard coating technology widely used in the field of ultraviolet light-polymerization type inks, were used as the dental coating material. However, since a ultraviolet light having a biodetrimental effect was used during the polymerization of the ultraviolet light-polymerizable dental coating compositions, realization of dental coating materials, for which a safer visible light could be used, was demanded. Thus, various compositions containing a (meth)acrylate-based monomer and a photopolymerization initiator have been proposed as a visible light-polymerizable dental coating composition and are now used in various fields including one of a dental resin material.

However, when a photopolymerizable dental coating composition comprised of a (meth)acrylate-based monomer as a major component is irradiated with light, though a radical polymerization chain reaction is initiated to cause a polymerization reaction, since oxygen in air acts as a polymerization inhibitor at this time, an unpolymerized (meth)acrylate-based monomer remains on the surface of the polymerized and cured dental coating material. For this reason, the surface of the cured dental coating material fails in smoothness, even leading to a problem that it remains sticky for a long time without being cured. This problem was especially remarkable in the case of photopolymerization with a visible light rather than with a ultraviolet light.

In addition, Japanese Patent Laid-Open No. 183904/1988 proposes a dental coating material that is a visible light polymerization-curable composition comprised of a dipentaerythritol acrylate-based monomer, a volatile solvent for the monomer, and a polymerization initiator as major components and discloses camphor qunione as the photopolymerization initiator. However, since the camphor quinone as the photopolymerization initiator, which is widely used in the dental field, is colored yellow as a color by nature, compositions containing it are yellowish. Further, in cured films obtained upon irradiation with a visible light, a yellow color remains. Accordingly, there was a defect of being aesthetically inferior. In order to solve this defect, Japanese Patent Laid-Open No. 366113/1992 proposes a visible light polymerization-curable composition; and Japanese Patent Laid-Open No. 29910/1992 proposes a photopolymerizable dental surface coating material. However, there was still a problem that any of these materials is inferior in resistance to discoloration and stain resistance.

SUMMARY OF THE INVENTION

The invention is aimed to provide a photopolymerizable dental coating composition that, when applied to the surface of a dental resin material such as crown restoratives, dental fillers, and denture or denture base resins, is thoroughly cured upon irradiation with a visible light and produces a smooth, colorless and transparent cured surface after curing so that a film having superior durability, abrasion resistance and resistance to discoloration can be formed.

In order to achieve the above-described aim, we, the present inventors made extensive and intensive investigations. As a result, it has been found that the above-described aim can be achieved by a photopolymerizable dental coating composition in which a volatile (meth)acrylate compound and a polyfunctional acrylate as a cross-linking agent are used for rapidly performing the polymerization and imparting superior surface curing properties; a specific fluoroalkyl group-containing (meth)acrylate compound is used for improving durability, abrasion resistance and resistance to discoloration after curing; and a specific photopolymerization initiator having a high polymerization promoting effect for the foregoing monomers, which does not make the polymerized composition remain yellowish, is additionally used, leading to accomplishment of the present invention.

Specifically, the present invention is concerned with a photopolymerizable dental coating composition comprising (A) a polyfunctional acrylate, (B) a volatile (meth)acrylate compound, (C) a fluoroalkyl group constituted of at least one fluorocarbon-containing (meth)acrylate compound, and (D) an acyl phosphine oxide-based polymerization initiator. In particular, are preferred photopolymerizable dental coating compositions comprising (A) 10 to 70% by weight of a polyfunctional acrylate, (B) 10 to 70% by weight of a volatile (meth)acrylate compound, (C) 10 to 70% by weight of a fluoroalkyl group constituted of at least one fluorocarbon-containing (meth)acrylate compound, and (D) 0.1 to 10% by weight of an acyl phosphine oxide-based polymerization initiator. Of these are especially preferred those in which the fluoroalkyl group constituted of at least one fluorocarbon-containing (meth)acrylate compound as the component (C) is 2,2,2-trifluoroethyl methacrylate or 2,2,2-trifluoroethyl acrylate.

DETAILED DESCRIPTION OF THE INVENTION

The polyfunctional acrylate as the component (A) that is used in the present invention is a monomer having a plurality of acryloyl groups acting as a cross-linking agent. Preferably, monomers having polymerization reactive groups as much as possible are selected among those having a plurality of acryloyl groups. Accordingly, are preferred polyfunctional acrylates in which at least three hydroxyl groups in one molecule of, e.g., pentaerythritol acrylate or dipentaerythritol acrylate, are modified to form an acrylic acid ester. In more detail, are preferred pentaerythritol triacrylate, pentaerythritol tetraacrylate, dipentaerythritol tetraacrylate, dipentaerythritol pentaacrylate, and dipentaerythritol hexaacrylate. Especially, dipentaerythritol hexaacrylate is most preferred, taking into consideration the operability and safety. Taking into consideration the polymerization rate and the gloss and strength after curing, a suitable compounding amount of the polyfunctional acrylate as the component (A) that is used in the present invention is in the range of 10 to 70% by weight in the composition. When the compounding amount of the polyfunctional acrylate as the component (A) is less than 10% by weight, the strength after curing tends to be insufficient, whereas when it exceeds 70% by weight, the drying properties during the application tend to be inferior.

The volatile (meth)acrylate compound as the component (B) that is used in the present invention is a highly volatile acrylate or methacrylate to be used for rapidly performing the polymerization and imparting superior surface curing properties. When the photopolymerizable dental coating composition is applied to a dental resin material, the volatile monomer on the surface of the film is vaporized. As a result, the concentration of the photopolymerization initiator only on the surface increases, whereby the surface curing properties of the photopolymerizable dental coating composition can be improved. This volatile (meth)acrylate is polymerized together with the polyfunctional acrylate as the component (A) during the polymerization and curing, to give a superior cured film. Examples of the volatile (meth)acrylate that can be used include methyl acrylate, methyl methacrylate, ethyl acrylate, and ethyl methacrylate. Of these, methyl methacrylate is most suitable, taking into consideration the safety and volatility. Taking into consideration the drying properties on the applied surface and the strength after curing, a suitable compounding amount of the volatile (meth)acrylate compound as the component (B) that is used in the present invention is in the range of 10 to 70% by weight in the composition. When the compounding amount of the volatile (meth)acrylate as the component (B) is less than 10% by weight, the drying properties on the surface tend to be remarkably lowered, whereas when it exceeds 70% by weight, the film during the application tends to be too thin, so that the strength after curing is likely insufficient.

The fluoroalkyl group constituted of at least one fluorocarbon-containing (meth)acrylate compound as the component (C) that is used in the present invention imparts high durability, abrasion resistance and resistance to discoloration to the cured photopolymerizable dental coating composition, and its examples include 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, and 2-(perfluorooctyl)ethyl (meth)acrylate, with 2,2,2-trifluoroethyl methacrylate and 2,2,2-trifluoroethyl acrylate being most preferred. With respect to the fluoroalkyl group constituted of at least one fluorocarbon-containing (meth)acrylate compound, as the (meth)acrylate compound contains a fluoroalkyl group constituted of a long-chain fluorocarbon, the durability of the cured photopolymerizable dental coating composition can be enhanced because of its characteristic high water repellency and oil repellency. Taking into consideration the resistance to discoloration, stain resistance and strength, a suitable compounding amount of the fluoroalkyl group constituted of at least one fluorocarbon-containing (meth)acrylate compound as the component (C) that is used in the present invention is in the range of 10 to 70% by weight in the composition. When the compounding amount of the fluoroalkyl group constituted of at least one fluorocarbon-containing (meth)acrylate compound as the component (C) is less than 10% by weight, the durability, the abrasion resistance and resistance to discoloration tend to be lowered, whereas when it exceeds 70% by weight, the smoothness and strength of the cured material tend to be lowered.

The acyl phosphine oxide-based polymerization initiator as the component (D) that is used in the present invention is a photopolymerization initiator capable of rapidly polymerizing the components (A) to (C) with a visible light. Any compounds can be used without particular limitations, so far as they have a skeleton where at least one acyl group {—C(=O)—} is bound to a =P(=O)— group. Examples include known monoacyl phosphine oxide derivatives, bisacyl phosphine oxide derivatives, and trisacyl phosphine oxide derivatives. Of these, the monoacyl phosphine oxide derivatives and bisacyl phosphine oxide derivatives are suitable because they are easily available from the industrial standpoint. Specific examples of the monoacyl phosphine oxide derivatives include 2,4,6-trimethylbenzoyldiphenyl phosphine oxide, 2,6-dimethoxybenzoyldiphenyl phosphine oxide, 2,6-dichlorobenzoyldiphenyl phosphine oxide, 2,4,6-trimethylbenzoylphenyl phosphinic acid methyl ester, 2-methylbenzoyldiphenyl phosphine oxide, and pivaloylphenyl phosphinic acid isopropyl ester. Specific examples of the bisacyl phosphine oxide derivatives include bis-(2,6-dichlorobenzoyl)phenyl phosphine oxide, bis-(2,6-dichlorobenzoyl)-2,5-dimethylphenyl phosphine oxide, bis-(2,6-dichlorobenzoyl)-4-propylphenyl phosphine oxide, bis-(2,6-dichlorobenzoyl)-1-naphthyl phosphine oxide, bis-(2,6-dimethoxybenzoyl)phenyl phosphine oxide, bis-(2,6-dimethoxybenzoyl)-2,4,4-trimethylpentyl phosphine oxide, bis-(2,6-dimethoxybenzoyl)-2,5-dimethylphenyl phosphine oxide, bis-(2,4,6-trimethylbenzoyl)phenyl phosphine oxide, and (2,5,6-trimethylbenzoyl)-2,4,4-trimethylpentyl phosphine oxide. Of these, bis-(2,4,6-trimethylbenzoyl)phenyl phosphine oxide is most suitable from the standpoints of easiness of industrial availability, storage stability and polymerization activity. These acyl phosphine oxide derivatives may be used singly or in admixture of two or more thereof. Alternatively, they may be mixed with, for example, benzil, benzil derivatives such as benzil methyl ketal, and anisil; thioxanthone derivatives such as 2-chlorothioxanthone, 2-ethylthioxanthone, 2-isopropylthioxanthone, and 2,4-diethylthioxanthone; 1-hydroxycyclohexyl phenyl ketone; 2-hydroxy-2-methyl-1-phenylpropan-1-one; 2,2-dimethoxy-1,2-diphenylethan-1-one; 2-methyl-1-[4-methylthio]phenyl]-2-morpholinopropan-1-one; and 2-benzyl-2-dimethylamino-1-(4-morpholinophenyl)butan-1-one. If desired, these photopolymerization initiators may be used together with a reducing agent such as ethanolamine derivatives (e.g., triethanolamine, N-methyldiethanolamine), amines of benzoic acid derivatives (e.g., 2-dimethylaminoethyl benzoic acid, 2-dimethylaminobenzoic acid ethyl ester, 4-dimethylaminobenzoic acid ethyl ester), and (meth)acryl group-containing amines (e.g., N,N-dimethylaminoethyl (meth)acrylate). Taking into consideration the polymerization rate and influences against the coloration of the cured material and the like, a suitable compounding amount of the acyl phosphine oxide-based polymerization initiator as the component (D) in the photopolymerizable dental coating composition according to the present invention is in the range of 0.1 to 10% by weight in the composition. When the compounding amount of the acyl phosphine oxide-based polymerization initiator as the component (D) is less than 0.1% by weight, the polymerization rate and the physical properties of the cured material tend to be lowered. On the other hand, when the acyl phosphine oxide-based polymerization initiator as the component (D) is compounded in an amount exceeding 10% by weight, the proportions of the other components decrease consequently, leading to a possible reduction in surface curing properties, resistance to discoloration, etc.

Besides, as a matter of course, the photopolymerizable dental coating composition according to the present invention may be properly compounded with fillers made of ultrafine silica, ultrafine alumina, etc. surface-treated to be hydrophobic, fillers made of surface-treated fine silica, organic fillers, colorants, polymerization inhibitors, ultraviolet light absorbers, bactericides, fluorescent agents, flavors, perfumes, and the like.

The present invention will be described below in detail with reference to the following Examples, but it should not be construed that the present invention is limited thereto. Examples 1 to 10 and Comparative Examples 1 to 4:

Formulations of Examples 1 to 10 and Comparative Examples 1 to 4 are shown in Table 1. Comparative Example 1 is in accordance with the formulation of the composition as disclosed in Japanese Patent Laid-Open No. 29910/1992. The respective compositions shown in Table 1 were prepared and tested for surface curing properties, abrasion resistance, and resistance to discoloration (stain resistance) supposing the staining within an oral cavity.

<Surface Curing Properties>

Each of the compositions was irradiated with light by a visible light curing unit for 3 minutes, and the surface curing properties were determined in the manners as described later. On a disk-like cured material (diameter: 15 mm, height: 1.5 mm) made of a denture base resin (a trade name: Acron, made by GC Corporation), was uniformly applied each of the compositions of the Examples and Comparative Examples, followed by irradiation with light for 3 minutes using a light curing unit (a trade name: Labolight LV-II, made by GC Corporation) Thereafter, the surface of the cured material was strongly rubbed by a hard paper (a trade name: JK Wiper 150-S, made by Crecia Corporation) for 20 seconds, and the surface state of the resulting material was visually observed. Thus, the surface curing properties were evaluated according to the following criteria. The results obtained are summarized and shown in Table 1.

C: The cured material surface was sticky due to the unpolymerized monomers, and numerous flaws were found.
B: The cured material surface was not sticky, but flaws were slightly found.
A: The cured material surface was not sticky, and flaws were not substantially found.

<Abrasion Resistance>

The test for abrasion resistance evaluated the hardness of the surface. The test was carried out in accordance with the pencil scratch test as defined in JIS K5400-1990. The results obtained are summarized and shown in Table 1.

<Resistance to Discoloration>

On a disk-like cured material (diameter: 15 mm, height: 1.5 mm) made of a filling composite resin (a trade name: Unifil S, made by GC Corporation), was uniformly applied each of the compositions of the Examples and Comparative Examples, followed by irradiation with light for 3 minutes using a light curing unit (a trade name: Labolight LV-II, made by GC Corporation). The resulting cured material was kept in a solution of 2 g of an instant coffee (a trade name: Nescafe Gold Blend, made by Nestle Japan Ltd.) in 100 g of water in a thermostatic chamber at 37° C. for one week, and the degree of coloration was evaluated using a photo diode array type spectrophotometer (a trade name: Spectra Scanner PR650, made by Photo Research) as a calorimeter. The colorimetry was carried out by measuring a central region of the sample having a diameter of 3 mm on a light trap or standard white board (magnesium oxide) from an angle of 45° with respect to the sample surface direction. In the CIE-L*a*b* color system, L*, a* and b* were calculated, and $\Delta E = [(L^*_1 - L^*_2)^2 + (a^*_1 - a^*_2)^2 + (b^*_1 - b^*_2)^2]^{1/2}$ was obtained from the colorimetric value before dipping ($L^*_1$, $a^*_1$, $b^*_1$) and the calorimetric value after dipping ($L^*_2$, $a^*_2$, $b^*_2$), thereby evaluating the resistance to discoloration. In general, when the $\Delta E$ value is 3 or more, a color tone different from an original color tone is recognized. The results obtained are summarized and shown in Table 1.

TABLE 1

| | Photopolymerizable dental coating composition (% by weight) | | | | | | | | | Surface curing properties | Abrasion resistance (pencil hardness) | Resistance to discoloration ($\Delta E$) |
|---|---|---|---|---|---|---|---|---|---|---|---|---|
| | (A) | | (B) | | (C) | | (D) | | Filler | | | |
| Example 1 | DPE-6A | 19.0 | MMA | 39.0 | 3FE | 40.0 | BTMPO | 2.0 | | | A | 3H | 2.03 |
| Example 2 | DPE-6A | 12.0 | MA | 32.0 | 17FE | 28.0 | BTMPO | 2.0 | | | A | 3H | 2.44 |
| | TMP-3A | 26.0 | | | | | | | | | | | |
| Example 3 | DPE-6A | 58.0 | MMA | 20.0 | 3FE | 20.0 | BTMPO | 2.0 | | | A | 3H | 2.48 |
| Example 4 | TMP-3A | 24.0 | MMA | 18.5 | 3FE | 19.0 | BTMPO | 2.0 | UFS | 0.5 | A | 2H | 2.08 |
| | DPE-6A | 30.0 | | | | | DMEMA | 6.0 | | | | | |
| Example 5 | PE-4A | 14.0 | MMA | 21.0 | 3FEA | 47.0 | BDMDPO | 3.0 | PMMA | 1.0 | A | 2H | 2.11 |
| | DPE-6A | 14.0 | | | | | | | | | | | |
| Example 6 | DTMP-4A | 19.0 | EMA | 39.0 | 3FEA | 38.0 | BTMPO | 2.0 | PMMA | 2.0 | A | 2H | 2.53 |
| Example 7 | PE-3A | 18.0 | MMA | 39.5 | 3FE | 42.0 | BTMPO | 0.5 | | | A | 2H | 2.83 |
| Example 8 | PE-3A | 8.0 | EA | 68.5 | 3FE | 9.2 | BDMDPO | 1.5 | UFS | 0.8 | B | 2H | 2.94 |
| | TMP-3A | 6.0 | | | 17FE | 6.0 | | | | | | | |
| Example 9 | PE-4A | 7.0 | MMA | 85.0 | 3FE | 7.0 | TMDPO | 1.0 | | | B | 2H | 2.98 |

TABLE 1-continued

| | Photopolymerizable dental coating composition (% by weight) | | | | | | | | Test results | | |
|---|---|---|---|---|---|---|---|---|---|---|---|
| | (A) | | (B) | | (C) | | (D) | | Filler | Surface curing properties | Abrasion resistance (pencil hardness) | Resistance to discoloration (ΔE) |
| Example 10 | DPE-6A<br>TMP-3A | 32.0<br>45.0 | MMA<br>MA | 6.0<br>6.0 | 17FE | 8.0 | TMDPO | 3.0 | | B | 2H | 2.21 |
| Comparative Example 1 | DPE-6A | 77.0 | MMA | 19.0 | | | TMDPO<br>DMEMA | 1.0<br>3.0 | | B | H | 8.53 |
| Comparative Example 2 | | | MMA | 50.0 | 3FE | 48.0 | BTMPO | 2.0 | | C | — | — |
| Comparative Example 3 | PE-4A | 50.0 | | | 17FE | 48.0 | BTMPO | 2.0 | | C | — | — |
| Comparative Example 4 | DPE-6A | 20.0 | MMA | 35.0 | 3FE | 36.0 | CQ<br>DMEMA | 6.0<br>3.0 | | B | H | 2.17 |

DPE-6A: Dipentaerythritol hexaacrylate
PE-4A: Pentaerythritol tetraacrylate
PE-3A: Pentaerythritol triacrylate
DTMP-4A: Ditrimethylolpropane tetraacrylate
TMP-3A: Trimethylolpropane triacrylate
MMA: Methyl methacrylate
MA: Methyl acrylate
EMA: Ethyl methacrylate
EA: Ethyl acrylate
3FE: 2,2,2-Trifluoroethyl methacrylate
3FEA: 2,2,2-Trifluoroethyl acrylate
17FE: 2-(Perfluorooctyl) ethyl methacrylate
BTMPO: Bis-(2,4,6-trimethylbenzoyl)phenyl phosphine oxide
BDMDPO: Bis-(2,6-dimethoxybenzoyl)-2,5-dimethylphenyl phosphine oxide
TMDPO: 2,4,6-Trimethylbenzoyldiphenyl phosphine oxide
DMEMA: Dimethylaminoethyl methacrylate
CQ: Camphor quinone
PMMA: Polymethyl methacrylate having a mean molecular weight of 250,000 and a mean particle size of 35 μm
UFS: Ultrafine silica having a mean particle size of 0.04 μm In Examples 1 to 10, good results were obtained in any of the tests. On the other hand, in Comparative Example 1, since the component (C) was not contained, the resistance to discoloration was low; and in Comparative Examples 2 and 3 in which either the component (A) or the component (B) was not contained, the polymerization did not substantially occur so that the test for abrasion resistance and the test for resistance to discoloration could not be carried out. Also, in Comparative Example 4, the abrasion resistance was low; and since camphor quinone as the photopolymerization catalyst was contained, the composition remained yellowish, though the resistance to discoloration was high.

As described above in detail, the photopolymerizable dental coating composition according to the present invention is, by irradiation with a visible light, rapidly cured even in the presence of oxygen to form a cured film that is superior in surface curing properties and is tough, colorless and transparent. Thus, the photopolymerizable dental coating composition according to the present invention is a photopolymerizable dental coating composition having superior surface curing properties, durability, abrasion resistance and resistance to discoloration in addition to the performance of the conventional dental coating composition. In consequence, the present invention is greatly valuable in contributing to the dental remedy field.

While the present invention has been described in detail and with reference to specific embodiments thereof, it will be apparent to one skilled in the art that various changes and modifications can be made therein without departing from the spirit and scope thereof.

What is claimed is:

1. A photopolymerizable dental coating composition comprising 10 to 70% by weight of the polyfunctional acrylate as the component (A), 10 to 70% by weight of the volatile (meth)acrylate compound as the component (B), 10 to 70% by weight of the fluoroalkyl group constituted of at least one fluorocarbon-containing (meth)acrylate compounds as the component (C); wherein the fluoroalkyl group has 2–3 carbon atoms, and 0.1 to 10% by weight of an acyl phosphine oxide polymerization initiator as the component (D).

2. The photopolymerizable dental coating composition according to claim 1, wherein the fluoroalkyl group constituted of at least one fluorocarbon-containing (meth)acrylate compound as the component (C) is 2,2,2-trifluoroethyl methacrylate or 2,2,2-trifluoroethyl acrylate.

3. The photopolymerizable dental coating composition according to claim 1, wherein the fluoroalkyl group constituted of at least one fluorocarbon-containing (meth)acrylate compound as the component (C) is 2,2,2-trifluoroethyl methacrylate.

4. The photopolymerizable dental coating composition according to claim 1, wherein the fluoroalkyl group constituted of at least one fluorocarbon-containing (meth)acrylate compound as the component (C) is 2,2,2-trifluoroethyl acrylate.

5. The photopolymerizable dental coating composition according to claim 1, wherein the fluoroalkyl group constituted of at least one fluorocarbon-containing (meth)acrylate compound as the component (C) is 2,2,3,3,3-pentafluoropropyl (meth)acrylate.

6. The photopolymerizable dental coating composition according to claim 1, further comprising a filler.

7. A dental coating that comprises a material prepared by a process, which comprises:
applying the photopolymerizable dental coating composition of claim 1 to a substrate and
irradiating the photopolymerizable dental coating composition and substrate with light.

* * * * *